US006308732B1

(12) United States Patent
Herndon

(10) Patent No.: US 6,308,732 B1
(45) Date of Patent: Oct. 30, 2001

(54) CONNECTOR AND METHOD OF SEALING ELECTRICAL WIRE AGAINST FLUID LEAKAGE

(75) Inventor: James A. Herndon, Cass City, MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/630,952

(22) Filed: Aug. 3, 2000

(51) Int. Cl.[7] .................................................... H02G 15/25

(52) U.S. Cl. .......................... 137/560; 137/588; 123/509; 29/868; 174/22 R; 174/23 R

(58) Field of Search .................................... 137/560, 588; 123/497, 509; 29/868, 872; 174/20, 22 R, 23 R

(56) References Cited

U.S. PATENT DOCUMENTS

| | | | | |
|---|---|---|---|---|
| 635,960 | * | 10/1899 | Grush | 174/23 R |
| 3,054,844 | * | 9/1962 | Divers et al. | 174/22 R |
| 3,458,644 | * | 7/1969 | Wright | 174/23 R |
| 3,639,201 | * | 2/1972 | Humphries | 174/23 R |
| 3,728,466 | * | 4/1973 | Rocton et al. | 174/23 R |
| 4,636,581 | * | 1/1987 | Roche et al. | 174/23 R |
| 4,659,868 | * | 4/1987 | Sala | 174/23 R |
| 5,536,904 | * | 7/1996 | Kojima et al. | 174/23 R |

* cited by examiner

*Primary Examiner*—John Rivell
(74) *Attorney, Agent, or Firm*—Reising, Ethington, Barnes, Kisselle, Learman & McCulloch, P.C.

(57) ABSTRACT

To seal an electrical wire and prevent fluid flow therethrough, individual strands of the wire are deformed and bonded together to provide a short segment of essentially solid wire without any gaps or flow paths through this segment. Desirably, the solid wire segment may be provided at the point in the wire where the wire passes through a wall of a sealed container, such as a fuel tank, to prevent fluid leakage out of the fuel tank through the wire. In the preferred embodiment, the individual strands of the wire are deformed and bonded together by ultrasonic welding of a section of the wire having its insulation removed. Other methods, such as coining, and laser or electron beam welding can be used to provide the essentially solid wire segment which prevents fluid leakage through the wire. Desirably, the method can be carried out by simply stripping the insulation from the desired wire segment and then performing the desired method of deforming and bonding the strands together, without having to separate the individual strands of wire and provide solder between them, and is therefore less time consuming and less costly to perform.

23 Claims, 2 Drawing Sheets

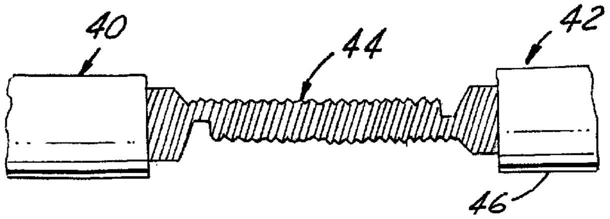
FIG.6
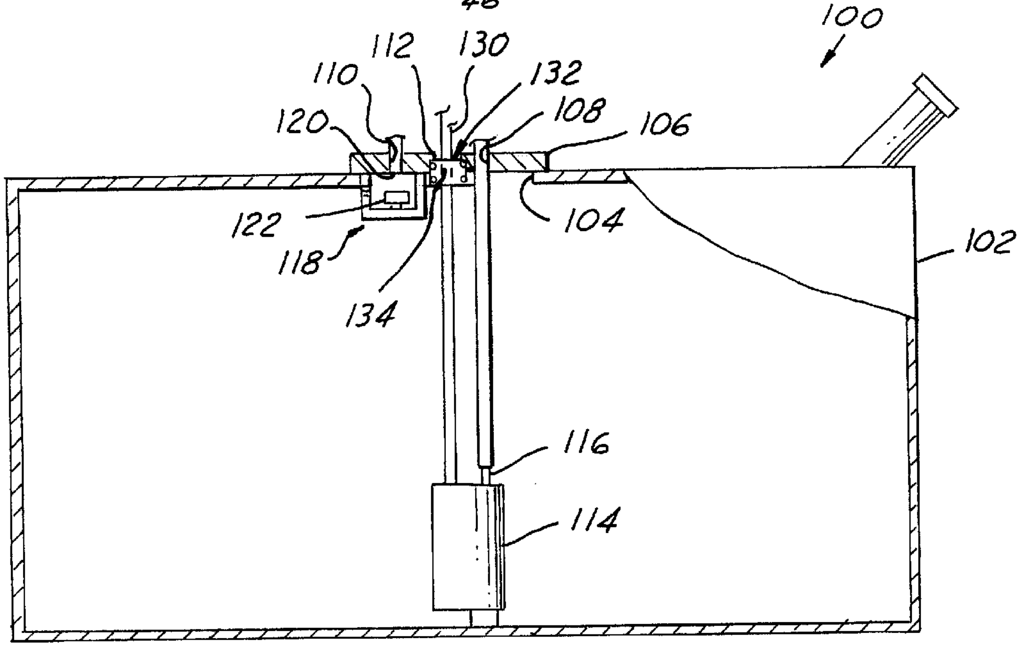
FIG.7
(PRIOR ART)
FIG.8
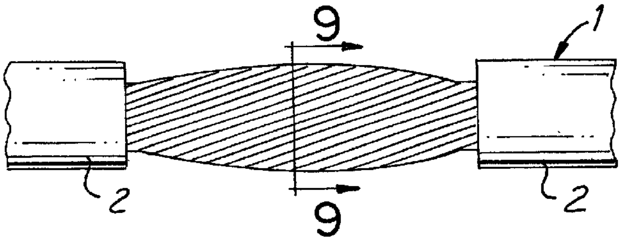
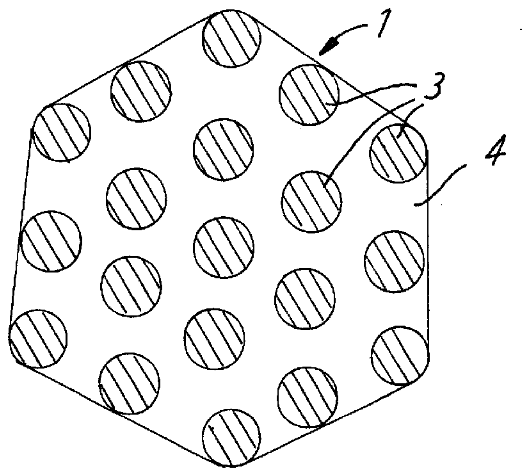
(PRIOR ART)
FIG.9

CONNECTOR AND METHOD OF SEALING ELECTRICAL WIRE AGAINST FLUID LEAKAGE

FIELD OF THE INVENTION

This invention relates generally to electrical wires and more particularly to a connector and method of sealing electrical wires in a body to prevent fluid leakage through the wire.

BACKGROUND OF THE INVENTION

In many applications, it is necessary to provide electrical wires from outside of a sealed fluid container to an interior of the fluid container. For example, in a fuel tank it may be necessary to provide electrical power to an electric motor fuel pump received within the fuel tank, and to provide electrical wires communicating various sensors within the fuel tank with components external to the fuel tank.

Particularly with gasoline and other fuels, it is important to limit the leakage of liquids and/or gases out of the fuel container. To do this, the electrical connections extending through the fuel tank must be sealed to prevent the escape to the atmosphere of hazardous hydrocarbon fuel vapors. Various so-called pass through electrical connectors are known and used to reduce the escape to the atmosphere of the hydrocarbon fuel vapors. However, even with a seal between the electrical wires and the connector, fluid may flow within the wire itself between the insulation and individual wire strands of the wires thereby providing a leak path out of the fuel tank.

As shown in FIGS. 8 and 9, one method to seal an electrical wire 1 and prevent fluid from passing through the wire out of a fuel tank or other liquid and/or gas container, has been to remove the insulation 2 from a desired segment of the wire 1, to then untwist and separate the various wire strands 3 from each other, and to thereafter fill the space between the wire strands with solder 4 or another sealing material. While this process is effective at preventing the leakage of fluid through the wire, it is time consuming, labor intensive and hence costly to perform.

SUMMARY OF THE INVENTION

To seal an electrical wire and prevent fluid flow therethrough, individual strands of the wire are deformed and bonded together to provide a short segment of essentially solid wire without any gaps or flow paths through this segment. Desirably, the solid wire segment may be provided at the point in the wire where the wire passes through a wall of a sealed connector or a container, such as a resin fuel tank, to prevent fluid leakage out of the fuel tank through the wire. In the preferred embodiment, the individual strands of the wire are deformed and bonded together by ultrasonic welding of a section of the wire having its insulation removed. Other methods, such as coining, and laser or electron beam welding can be used to provide the essentially solid wire segment which prevents fluid leakage through the wire. Desirably, the method can be carried out by simply stripping the insulation from the desired wire segment and then performing the desired method of deforming and bonding the strands together to form the solid wire segment, without having to separate the individual strands of wire and provide solder between them, and is therefore less time consuming and less costly to perform. The solid wire segment may then be overmolded in a resin body or wall of the connector or container.

Objects, features and advantages of this invention include providing a method of sealing an electrical wire in a resin body to prevent fluid leakage therethrough which is ideally suited for use in fuel tanks, eliminates a source of fluid leakage from a fluid container, reduces the cost and complexity of electrical pass through connectors, eliminates the need to separate the individual strands of the wire and to provide solder between them, facilitates splicing two wire segments together, permits use of wires with different properties, is of relatively simple design and economical manufacture and assembly, is reliable, efficient, effective and has a long service life in use.

BRIEF DESCRIPTION OF THE DRAWINGS

These and other objects, features and advantages of this invention will be apparent from the following detailed description of the preferred embodiments and best mode, appended claims and accompanying drawings in which:

FIG. 6 is a fragmentary side view of a pair of wires spliced together and sealed according to one aspect of the present invention;

FIG. 7 is a diagrammatic view of a fuel system utilizing wires sealed against fluid leakage;

FIG. 8 is a fragmentary side view of a wire having an intermediate segment of its insulation removed and its strands interconnected by solder according to the prior art; and FIG. 9 is a cross sectional view taken generally along line 9—9 of FIG. 8 and further illustrating the method of sealing the wire according to the prior art.

DETAILED DESCRIPTION OF THE PREFERRED EMBODIMENTS

Figure 1:
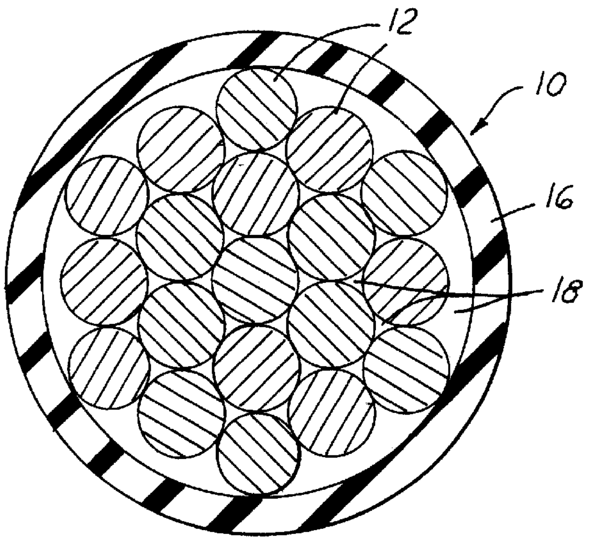
FIG. 1 is a cross sectional view of a typical electrical wire having individual copper wire strands received within an outer insulation.
Figure 2:
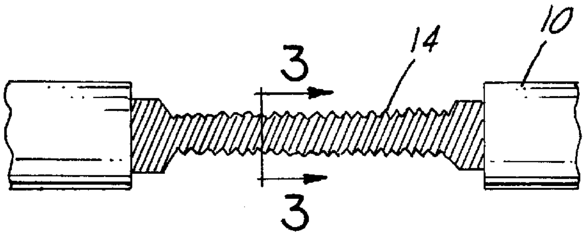
FIG. 2 is a fragmentary side view of a wire sealed against fluid leakage according to the present invention.
Figure 3:
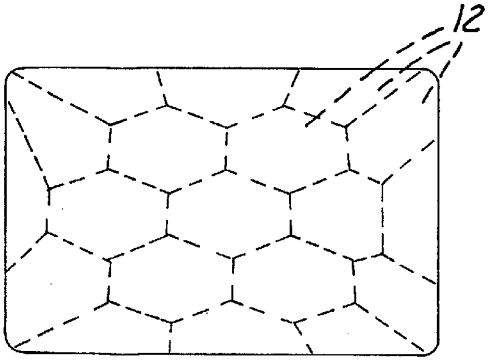
FIG. 3 is a cross sectional view taken generally along line 3—3 of FIG. 2.

Referring in more detail to the drawings, FIGS. 1–3 illustrate an electrical wire 10 sealed against fluid leakage in accordance with the present invention by deforming and bonding individual copper wire strands 12 together to form a short segment of essentially solid wire 14 without any continuous leak paths therethrough. Prior to being sealed according to the method of the present invention, as shown in FIG. 1, the electrical wire 10 is generally cylindrical with an annular outer layer of insulation 16 and a plurality of individual copper wire strands 12 received closely within the insulation. Gaps, open spaces or flow paths 18 between the individual wire strands 12 themselves, and between the wire strands 12 and the insulation 16, provide passages or paths through which a fluid may travel or leak through the wire 10. To prevent the fluid leakage through the wire 10, the individual wire strands 12 are deformed and joined together to form a short segment of solid wire 14 without any gaps or any continuous flow paths therethrough, as best shown in FIG. 3.

Figure 4:
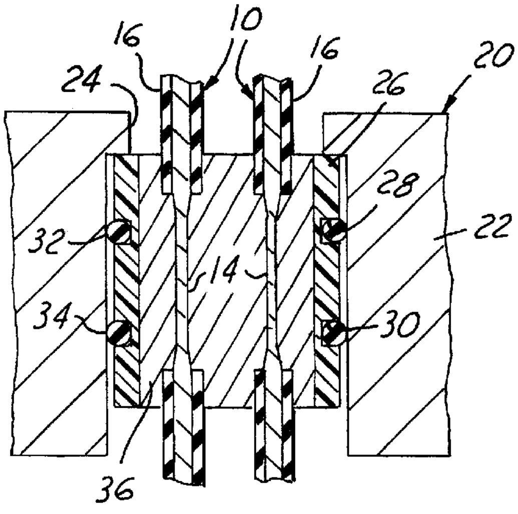
FIG. 4 is a fragmentary cross sectional view illustrating an electrical pass through connector utilizing wires sealed against fluid leakage according to the present invention.

To seal an electrical wire 10 against fluid leakage by the method of the present invention, as best shown in FIGS. 2–4, a short segment of the outer insulation 16 of the wire 10 is removed to expose the individual copper wire strands 12. The exposed copper wire strands 12 are then deformed and bonded together to form a short segment of essentially solid wire 14 without any gaps or continuous flow paths 18 between adjacent copper wire strands 12. According to the preferred embodiment, the exposed segment of copper wire strands 12 are ultrasonically welded to deform and bond together the individual wire strands 12 and form the essentially solid wire segment 14. The approximate outlines of the individual copper wire strands 12 are indicated in phantom in FIG. 3 although, in this segment 14 the wire strands 12 are no longer separate, rather, they are bonded together to form a segment of essentially solid wire. During the ultrasonic welding process the wire strands 12 reach a temperature such that they begin to melt and the copper material of the wire strands flows and bonds with the material of adjacent wire strands 12 to form a single unit or solid wire segment. The wires are preferably heated to a temperature of between 1400° F. and 2000° F. The process may take less than one second per wire and is highly effective at preventing leakage through the wire. Methods other than ultrasonic welding may also be used to form the generally solid wire segment 14. By way of example and not limitation, coining or other cold forming methods, laser welding and electron beam welding may be used to deform and bond together the copper wire strands 12 to form the solid wire segment 14 and eliminate any continuous flow paths 18 through that segment.

Figure 5:
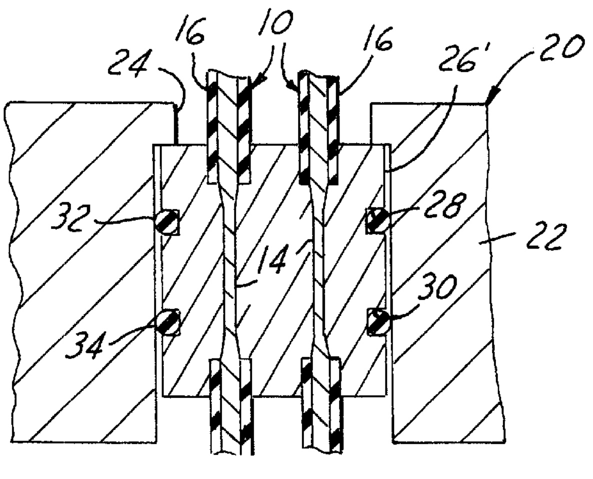
FIG. 5 is a fragmentary cross sectional view illustrating a modified electrical pass through connector utilizing wires sealed against fluid leakage according to the present invention.

As best shown in FIG. 4, wires 10 provide a sealed connector communicating electrical devices outside of a fuel tank 20 with electrical devices or sensors inside of the fuel tank 20. Desirably, the essentially solid wire segment 14 is disposed in the section of the wire which passes through a wall 22 of the tank 20. As shown, an opening 24 is provided through the fuel tank wall 22 and an annular housing 26 is disposed in that opening 24. The housing 26 has a pair of annular grooves 28, 30 about its exterior each of which is constructed to receive an O-ring 32, 34 to provide a seal between the housing 26 and the container wall 22. The housing 26 may be filled with a suitable resin or other potting material 36 or other sealant to maintain the position of the wires 10 in the housing and to prevent fluid leakage between the wires 10 and the housing 26 and out of the fuel tank 20. As an alternative to the housing 26 with the potting material therein, as shown in FIG. 5, the wires 10 may be over molded with a body 26' of a suitable plastic or polymeric material which carries the O-rings 32, 34 to prevent fluid leakage between the over molded plastic body 26' and the fuel tank 20.

As shown in FIG. 6, an additional benefit of the present invention is that two different wires 40, 42 may be spliced together at a junction 44 defining in part the essentially solid segment of wire. Therefore, a portion 42 of the spliced wire within the fuel tank may have different wire strands, insulation or properties than the portion 40 of the spliced wire outside of the fuel tank. Desirably, the wire portion 42 within the fuel tank may have an insulation 46 resistant to degradation or swelling within a liquid with which it is used, such as hydrocarbon fuel, (and particularly by a hydrocarbon fuel containing alcohol such as gasahol) and the wire portion 40 outside of the fuel tank may have other properties since it is not exposed to liquid fuel. Notably, the portion 42 of the spliced wire disposed within the fuel tank is selected to provide the desired fuel resistant properties, such as Teflon insulated wire or Weico THHN insulated wire available from Weico Wire and Cable, Inc., of Edgewood, N.Y. These wires are relatively expensive. Hence, it is desirable to reduce the length of this wire used to reduce the system cost. The length of the wire outside of the fuel tank may be considerably longer than that inside the fuel tank such that it is desirable to use a lower cost wire outside of the tank. Desirably, the two wires can be spliced together as the essentially solid wire segment 14 is formed, with a portion of the segment 14 formed in a portion of the strands of each wire. Thus, the function of preventing fluid leakage through the wire and splicing two or more wires together is accomplished in the same step.

Therefore, according to the present invention, connectors are produced with electrical wires 10 sealed to prevent fluid leakage through them by a relatively simple, yet highly effective method. Notably, the individual wire strands 12 do not have to be separated to permit solder or another sealant to be received around and between each of the wire strands 12 to block the flow paths 18 through the wire. Therefore, the connector and method of the present invention is faster, requires less labor, and therefore is less costly to perform to reduce the cost of an electrical pass through connector. Ideally, the method may be used with wires which pass into a fuel tank to reduce the escape to the atmosphere from the fuel tank 20 of hazardous hydrocarbon fuel vapors. By providing the essentially solid segment of wire 14 formed by the method of the invention within an opening 24 of the fuel tank 20, the escape of fluid from the fuel tank 20 through the wire 10 can be eliminated. Advantageously, the wires 10 may be simply disposed within potting material 36 closing the opening 24 of the fuel tank 20 or may be over molded by a suitable polymeric body 26' disposed in and closing the opening 24 of the fuel tank 20. Further, two or more wires may be easily spliced together at the same time that the solid wire segment 14 is formed.

As shown in FIG. 7, the invention may be readily applied to a fuel system 100 having a fuel tank 102 with an opening 104 therethrough and a cover 106 spanning the opening 104 and sealed to the fuel tank 102. Desirably, the fuel tank 102 and the cover 106 maybe formed of a polymeric material and the cover 106 may be welded to the tank 102.

The cover 106 has a plurality of openings 108, 110, 112 therethrough, with three openings shown, but more or fewer openings may be provided. A fuel pump 114 disposed in the fuel tank 102 has an outlet 116 communicating with one opening 108 through the cover to deliver fuel from the fuel tank 102 under pressure. A vapor vent valve 118 has an outlet 120 and a valve 122 selectively closing the outlet 120 to control fluid flow therethrough. The outlet 120 communicates with an opening 110 through the cover 106 to communicate the valve 118 with the exterior of the fuel tank 102.

To provide electrical power to the fuel pump 114 and to communicate signals to and from sensors in the fuel system 100 and/or fuel tank 102, it is necessary to pass electrical wires 130 into the fuel tank 102. The wires 130 pass through at least one opening 112 in the cover 106 and extend through a body 132 carried by the cover with seals between the body 132 and wires 130 and between the body 132 and cover 106. Notably, the wires 130 may be molded within the cover 106 with the cover 106 integral with and defining the body 132. Otherwise, a potting or other sealing material may define the body 132.

The wires 130 have individual wire strands deformed and bonded together as described above to define an essentially solid wire segment 134 to at least substantially prevent fluid flow therethrough. The segment 134 is preferably provided within the portion of each wire 130 which passes through the cover 106 and, in combination with the seals between each wire 130 and body 132 and the body 132 and cover 106, limits or prevents fluid flow out of the tank 102 through the cover opening 112.

What is claimed is:

1. A method of sealing at least one electrical wire having a plurality of individual wire strands disposed within an outer insulation, comprising the steps of:

a) removing a segment of the outer insulation from the wire to expose a corresponding portion of the wire strands; and b) deforming and bonding together the wire strands in at least a part of said corresponding portion of the wire strands to define an essentially solid wire segment without any continuous leak paths.

2. The method of claim 1 wherein step b) is accomplished by ultrasonically welding together the wire strands of the portion of the wire having its insulation removed.

3. The method of claim 1 wherein step b) is accomplished by coining together the wire strands of the portion of the wire having its insulation removed.

4. The method of claim 1 wherein step b) is accomplished by laser welding together the wire strands of the portion of the wire having its insulation removed.

5. The method of claim 1 wherein step b) is accomplished by electron beam welding together the wire strands of the portion of the wire having its insulation removed.

6. The method of claim 1 wherein the wire strands are formed of copper and step b) is accomplished by heating the copper wire strands to a temperature of between 1400 and 2000 degrees Fahrenheit to weld the wire strands into a solid mass.

7. A method of forming an electrical connector constructed to pass wires through a wall of a fluid container having an opening, comprising the steps of:

a) providing an electrical wire having a plurality of individual wire strands disposed within an outer insulation;

b) removing a portion of the insulation of the wire to expose a segment of the wire strands;

c) deforming and bonding together the wire strands in at least a portion of said segment into an essentially solid wire without any continuous leak paths therethrough; and d) disposing the solid wire in sealed relation within a body adapted to be received within and to seal an opening of the fluid container with the wire passing through the opening and into the fluid container in assembly.

8. The method of claim 7 wherein the body comprises an outer housing filled with potting material which surrounds the solid wire and prevents fluid leakage between the potting material and the solid wire.

9. The method of claim 8 wherein the housing carries at least one sealing member to prevent leakage between the body and the fuel tank through the opening of the fuel tank in which the body is received.

10. The method of claim 7 wherein the body is provided by over molding the solid wire with a polymeric material which sealingly engages the solid wire to prevent fluid leakage between the solid wire and the body.

11. The method of claim 7 wherein step c) is accomplished by ultrasonically welding together the wire strands of the segment of the wire having its insulation removed.

12. The method of claim 7 wherein step c) is accomplished by coining together the wire strands of the segment of wire having its insulation removed.

13. The method of claim 7 wherein step c) is accomplished by laser welding together the wire strands of the portion of the wire having its insulation removed.

14. The method of claim 7 wherein step c) is accomplished by electron beam welding together the wire strands of the portion of the wire having its insulation removed.

15. A method of connecting together and sealing at least a pair of wires each having an outer insulation and a plurality of wire strands within the insulation, comprising the steps of:

a) providing a first wire and removing a portion of its insulation to expose a portion of the wire strands of the first wire;

b) providing a second wire and removing a portion of its insulation to expose a portion of the wire strands of the second wire; and c) deforming and bonding together at least a portion of the exposed wire strands of the first wire and of the second wire to join the first wire and the second wire and to define an essentially solid wire segment defined in part in the first wire and the second wire to prevent fluid leakage therethrough.

16. A connector, comprising:

a body;

at least one wire passing through the body in sealed relation therewith to at least substantially prevent fluid flow between the body and said at least one wire, said at least one wire having a plurality of individual wire strands with the wire strands deformed and bonded together along a segment of the wire to define an essentially solid wire segment preventing fluid flow therethrough.

17. The connector of claim 16 wherein the essentially solid wire segment is disposed within the body.

18. The connector of claim 16 wherein the body comprises an outer housing filled with a sealing material which surrounds and sealingly engages the wire.

19. The connector of claim 16 wherein the body is comprised of a polymeric material overmolded on the wire.

20. A fuel system, comprising:

a fuel tank having an opening and a cover spanning the fuel tank opening, sealed to the fuel tank and having a plurality of openings therethrough;

a fuel pump disposed within the fuel tank and having an outlet communicating with an opening through the cover to deliver fuel out of the fuel tank under pressure;

a vapor vent valve disposed in the fuel tank and having an outlet communicating with another opening through the cover and a valve which selectively permits fuel vapor to flow out of the fuel tank through the vapor vent valve outlet and its associated opening through the cover; and a connector carried by the cover and having a body and a wire passing through the body and an opening of the cover into the fuel tank with a seal between the wire and the body to at least substantially prevent fluid flow therethrough and a seal between the body and the cover to at least substantially prevent fluid flow therethrough, said wire having a plurality of wire strands with the wire strands deformed and bonded together along a segment within the body to define an essentially solid wire segment to at least substantially prevent fluid flow therethrough.

21. The fuel system of claim 20 wherein the fuel tank is formed of a polymeric material and the cover is formed of a polymeric material and is welded to the tank in assembly.

22. The fuel system of claim 20 wherein the body comprises sealing material disposed within the respective opening of the cover through which the wire extends.

23. The fuel system of claim 20 wherein the body is integral with the cover.

* * * * *